Nov. 26, 1968    J. E. GILMORE    3,413,149
APPARATUS AND METHOD FOR CLEANING A COOLING SYSTEM
Filed June 15, 1964
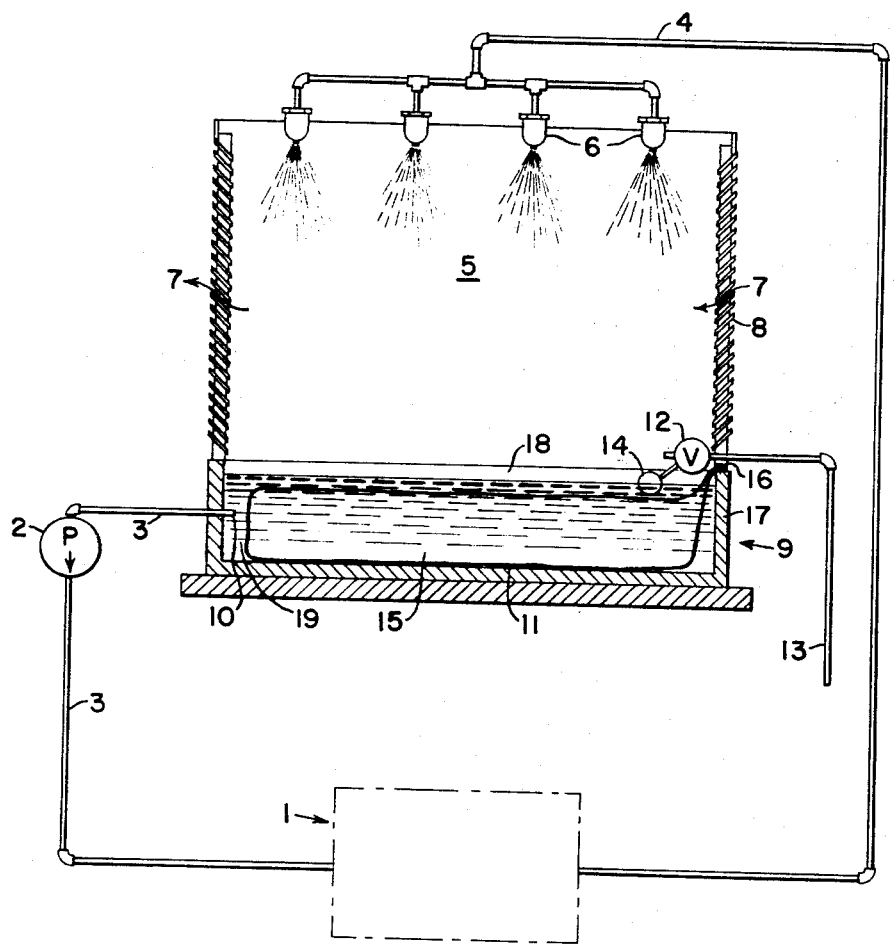
INVENTOR
JOHN E. GILMORE
BY Lamont Johnston
ATTORNEY

United States Patent Office 3,413,149
Patented Nov. 26, 1968

3,413,149
APPARATUS AND METHOD FOR CLEANING A COOLING SYSTEM
John E. Gilmore, Nashville, Tenn., assignor of forty percent to John Caillouette, and twenty percent to Harlan Dodson, Nashville, Tenn.
Filed June 15, 1964, Ser. No. 375,085
2 Claims. (Cl. 134—22)

ABSTRACT OF THE DISCLOSURE

An apparatus and a method for cleaning a circulating water cooling system having a sump for receiving the water after it is cooled by being sprayed from nozzles through air circulating through a cooling tower. A flexible container, such as of a plastic material, is filled with a liquid such as water which is sealed in it and takes the place of most of the free water in the sump, thus reducing the quantity and cost of acid needed to make a concentrated solution for cleaning the system. The flexible container is long and wide enough, when emptied and flattened, to fasten to the cooling tower in an inclined position above the sump to divert away from the sump and to drain the used acid and dissolved impurities sprayed through the nozzles as the system is being flushed.

---

This invention relates to an apparatus and a method for cleaning a circulating water cooling system.

In systems for providing cooling, such as those used in the air conditioning of large buildings, water is circulated through cooling coils, such as those of condensers, where heat is absorbed by the water. To remove the heat from the water, it is conducted to a spray filled atmospheric cooling tower, usually located on the roof of the building. The water is there sprayed from nozzles through air circulating in and out of the tower, usually downward into a collecting sump in the bottom of the tower. The circulating air absorbs directly a large proportion of the heat in the water and a small part of the water evaporates. Since evaporation is a process of cooling caused by the removal of latent heat, this action further cools the remaining water, which is thus rendered cool enough to be again circulated through the cooling coils.

During the process of evaporation, the mineral and other solids suspended or dissolved in the evaporated water are left in the remaining, unevaporated water, so that such solids become more concentrated. Eventually, the concentration of the solids, such as lime, calcium, etc., becomes so great that they are deposited as scale on interial and exposed surfaces of the system. Such scaly deposits occur most in the warmest parts of the system, e.g. in the tubing of condensers or other heat transfer apparatus. Deposits also collect in the sump of the cooling tower. A condition of clogging of the system by scale is reached recurrently in which the scale must be cleaned out, to minimize its insulating effect which retards heat transfer.

In order to clean the scale from the cooling system, a solvent, such as an acid, is introduced into and circulated through the system, dissolving the scale, which is alkaline. The more concentrated the acid, the more complete is the scale removal and the more rapidly it is accomplished, with consequent saving in the cost of the labor of the cleaning force. On the other hand, the large volume of water in a cooling system requires a large quantity of acid to make a concentrated solution, with consequent expense for material. Also, with a large volume of concentrated solution, considerable time is required to remove the solution from the system and to flush the system with sufficient water to reduce the acidity to an acceptable maximum level.

Accordingly, one object of the invention is to provide an apparatus and a method for cleaning a circulating water cooling system which are inexpensive in cost of materials.

Another object is to provide such an apparatus and method which are efficient in saving of time and thereby of the cost of labor.

Other objects and advantages of the invention will be apparent from the following description, taken in conjunction with the accompanying drawings, in which:

The single figure of the drawing is a diagrammatic elevation of a circulating water cooling system including a cooling tower sump incorporating the apparatus and method of my invention.

In the drawing, a circulating water cooling system is illustrated diagrammatically, including heat transfer apparatus, such as condenser tubing and associated piping, etc., generally indicated at 1. A pump 2 moves water through a pipe 3 into the heat transfer apparatus, where the water absorbs heat through cooling coils. The warm water then passes through a pipe 4 to an atmospheric cooling tower 5. The water passes through a plurality of nozzles 6 from which it sprays downwardly through air currents 7 circulating in and out of the tower as a consequence of atmospheric wind and turbulence. The tower is open at its top, and its sides and ends are partially closed by louvers or slats 8 which serve the purpose of preventing the water from spraying outside of the tower, these slats being removable when necessary. The bottom of the tower consists of a collecting sump, generally indicated at 9, in which the water sprayed from the nozzles is collected. Water is removed from the sump through a pump inlet 10, which is located several inches above the sump bottom 11 in order to avoid taking trash into and contamination of the system. The pump 2 recirculates the water through the pipe 3 back to the heat transfer apparatus 1. As described above, the water is cooled by heat exchange directly with the air 7 as it sprays from the nozzles 6 into the sump and it is also cooled by evaporation of part of it.

To replace the water lost by evaporation or by draining of the sump, an automatic water metering inlet valve 12 is provided, through which water flows from a supply pipe 13 into the sump. The action of the inlet valve is controlled by a float 14.

Because of the fact that the inlet 10 of the pump 2 must be above the bottom 11 of the sump to avoid contamination of the system by trash, the level of the water in the sump must be high enough to flow into the inlet. A large part of the volume of the water in the sump is wasteful in diluting the solvent needed to clean the system. By my invention, the greatest part of this wasteful water is eliminated from the sump as water free to circulate and the advantages already mentioned are achieved.

In order to minimize the quantity of solvent needed to obtain a rather concentrated solution to circulate through the system for cleaning of scale and thus also to minimize the time and labor cost required for the cleaning, the quantity of solution in the sump can be radically reduced. This is accomplished according to my invention by displacing a large part of the volume of the water in the sump, while at the same time maintaining the level of the water in the sump which is free to circulate high enough to flow into the pump inlet. The means for doing this can conveniently be a flexible container 15, for example a plastic bag of suitable shape and size. Such a bag may be of a relatively thick or heavy material, in which case it may be used repeatedly until it is worn out or punctured, or it may be a bag of a thin material such as is readily available commercially in cylindrical form, usually heat-sealed to close one end and open at the other end.

In carrying out the invention, workmen remove the slats 8 from the cooling tower, drain the water from the sump through a drain, not shown, and clean the sump while the water is draining out. The drain is then closed and an empty bag 15 is placed on the floor 11 of the sump. The bag may previously have been partially sealed at its open end, leaving only one corner open. It is filled with water through the inlet valve 12, after which the open corner or end may be tied shut with a string or copper wire, so that the bag will hold the water. The open end of the filled bag, instead of being tied shut, may be folded over an edge of the sump and thumbtacked in place, as indicated at 16, to the end 17 or a side 18 of the sump, to hold the bag in place. The bag 15 is positioned away from the inlet valve 12 and its float 14 to avoid interference therewith. The filled bag displaces the same quantity of water which would otherwise fill the sump and thus leaves less space to contain free water, indicated at 19, to which the solvent is added. By this means and method, the quantity of solvent required to obtain a solution of satisfactory concentration is only about one-fourth of that which would normally be required without the use of the bag and the time required for the cleaning operation is considerably reduced.

A suitable solvent is then added to the free water 19 and the solution is circulated through the system to accomplish the removal of lime, calcium and other deposits in the system.

After the cleaning of the system, the pump 2 is stopped and especially if an inexpensive, thin-walled, bag is used, it can be slit open on one side and on its sealed end to release the water inside it. This fills the tower sump with the fresh water, immediately bringing the water to a level suitable for operation of the equipment. The slit side and end of the bag can then be thumbtacked onto the side and end of the tower 5 above the sump to hold the flattened-out bag in place over the sump 9 and under the spray nozzles 6, with one end of the bag lower than the other end. The pump is again started into operation and the bag positioned as just described will catch all of the solvent-laden liquid coming through the spray nozzles 6 from the system, which liquid remains in the system after the cleaning operation. Since one end of the slit bag is lower than the other and the flattened bag covers the entire area of the sump under the nozzle, the solution circulated by the pump will be drained out of the tower and onto the roof of the building or the ground, thereby removing the solvent-laden water entirely from the system.

As already mentioned, if a bag of heavy plastic is used, it can be reused repeatedly, in which case it would not, of course, be slit open and used for drainage of the remaining solution from the system.

As pointed out above, this invention saves radically in the quantity of expensive solvent needed for removing mineral deposits from a cooling system. It also minimizes, due to permitting a concentrated solution at minimum expense and due to minimizing the quantity of solution needed for the cleaning, the time and cost of the labor required for the cleaning operation.

It will be apparent to those skilled in the art that various changes may be made in the invention, without departing from the spirit and scope thereof, and therefore the invention is not limited by that which is shown in the drawings and described in the specification, but only as indicated in the appended claims.

I claim:

1. In a circulating water cooling system in which a cooling tower sump receives water cooled by being sprayed from nozzles through circulating air and a pump circulates the cooled free water from an inlet spaced above the bottom of the sump through the system, the sump containing free water kept sufficiently deep to maintain the surface level of the free water above the pump inlet, an apparatus to facilitate cleaning the system including a flexible container filled with a liquid in the sump for taking the place of a large proportion of the free sump water when a cleaning solvent is added to the free sump water to be circulated through the system, the container being openable to empty its contents into the sump and having sufficient length and area when emptied and flattened out to cover in an inclined position the entire area of the sump.

2. The method of facilitating cleaning a circulating water cooling system including reducing the volume of free-water normally circulating through the system by taking the place of a portion of it in a sump in the system with a closed container of water, circulating a solvent in the reduced volume of free water through the system, emptying the water from the container into the system and covering the sump with the emptied container to drain off the spent solvent.

References Cited

UNITED STATES PATENTS

| 300,636 | 6/1884 | Pike. | |
|---|---|---|---|
| 614,625 | 11/1898 | Saunders. | |
| 1,852,144 | 4/1932 | Brogden et al. | 99—156 |
| 2,859,766 | 11/1958 | Shuldener | 137—268 |
| 3,000,619 | 9/1961 | Baker et al. | |
| 3,331,375 | 7/1967 | Hickey et al. | 134—127 |

MORRIS O. WOLK, *Primary Examiner.*

J. ZATARGA, *Assistant Examiner.*